United States Patent
Singh et al.

(10) Patent No.: US 7,836,359 B2
(45) Date of Patent: Nov. 16, 2010

(54) TIME STAMPING TRANSACTIONS TO VALIDATE ATOMIC OPERATIONS IN MULTIPROCESSOR SYSTEMS

(75) Inventors: Padmaraj Singh, Dresden (DE); Todd Foster, Austin, TX (US); Dennis Lastor, Austin, TX (US)

(73) Assignee: Globalfoundries Inc., Grand Cayman (KY)

( * ) Notice: Subject to any disclaimer, the term of this patent is extended or adjusted under 35 U.S.C. 154(b) by 609 days.

(21) Appl. No.: 11/891,165

(22) Filed: Aug. 9, 2007

(65) Prior Publication Data

US 2008/0209176 A1   Aug. 28, 2008

(30) Foreign Application Priority Data

Feb. 28, 2007   (DE)   .................. 10 2007 009 909

(51) Int. Cl.
G06F 11/00   (2006.01)
(52) U.S. Cl. .......................................... 714/48; 714/20
(58) Field of Classification Search .................... 714/48
See application file for complete search history.

(56) References Cited

U.S. PATENT DOCUMENTS

| | | | |
|---|---|---|---|
| 6,658,519 B1 * | 12/2003 | Broberg et al. | 710/311 |
| 6,766,419 B1 * | 7/2004 | Zahir et al. | 711/133 |
| 6,792,563 B1 * | 9/2004 | DesRosier et al. | 714/43 |
| 6,823,347 B2 | 11/2004 | Chandrasekaran | |
| 7,055,060 B2 * | 5/2006 | Nguyen et al. | 714/11 |
| 7,080,376 B2 * | 7/2006 | Buch | 718/100 |
| 7,174,554 B2 * | 2/2007 | Pierce et al. | 718/107 |
| 7,188,052 B2 * | 3/2007 | Levine et al. | 702/187 |
| 7,236,967 B2 * | 6/2007 | Hogan | 707/1 |
| 7,251,748 B2 * | 7/2007 | Liberty et al. | 714/20 |
| 7,266,571 B2 | 9/2007 | Botzer | |
| 7,350,034 B2 * | 3/2008 | Shen | 711/145 |
| 7,366,843 B2 | 4/2008 | Cypher et al. | |
| 7,506,339 B2 * | 3/2009 | Buch | 718/100 |
| 7,644,238 B2 * | 1/2010 | Carrie | 711/147 |
| 2004/0123185 A1 * | 6/2004 | Pierce et al. | 714/38 |
| 2004/0123201 A1 * | 6/2004 | Nguyen et al. | 714/736 |
| 2007/0006150 A9 * | 1/2007 | Walmsley | 717/120 |
| 2007/0283337 A1 * | 12/2007 | Kasahara et al. | 717/149 |
| 2008/0109641 A1 * | 5/2008 | Ball et al. | 712/216 |
| 2008/0140962 A1 * | 6/2008 | Pattabiraman et al. | 711/162 |
| 2008/0148096 A1 * | 6/2008 | Zarnke et al. | 714/6 |
| 2009/0064149 A1 * | 3/2009 | Singh et al. | 718/101 |

OTHER PUBLICATIONS

Translation of Official Communication in application No. DE 10 2007 009 909.8-53 issued Nov. 21, 2007.

* cited by examiner

*Primary Examiner*—Scott T Baderman
*Assistant Examiner*—Kamini Patel
(74) *Attorney, Agent, or Firm*—Meyertons, Hood, Kivlin, Kowert & Goetzel, P.C.; Erik A. Heter

(57) ABSTRACT

A multi-core microprocessor has a plurality of processor cores which are coupled to a bridge element. The bridge element sends transactions to and/or receives transactions from the processor cores, where each transaction has one or more packets. The transactions include atomic transactions. The bridge element comprises a buffer unit storing a time stamp for each packet sent or received. Furthermore, a multi-core multi-node processor system is provided that has debug hardware to capture and time stamp intra-node and/or inter-node transaction packets. Atomic operations are, for example, atomic read-modify-write instructions.

16 Claims, 10 Drawing Sheets

TIME STAMPING TRANSACTIONS TO VALIDATE ATOMIC OPERATIONS IN MULTIPROCESSOR SYSTEMS

BACKGROUND OF THE INVENTION

1. Field of the Invention

The invention generally relates to multi-core microprocessors, multiprocessor systems and corresponding methods, and in particular to the validation of atomic transactions in multiprocessor environments.

2. Description of the Related Art

Multiprocessor systems are computing environments that use two or more central processing units (CPUs) within a single platform. Multiprocessing also refers to the ability of a computing system to support more than one processor and to allocate tasks between them. In general, multiprocessing systems may be built using multiple cores on one die, multiple chips in one package, multiple packages in one system unit, or the like.

Such multiprocessor systems may become quite complex and therefore require powerful tools to validate the correctness and robustness of the overall operation. Such validation is helpful both in the design phase as well as at a later stage in simulation or real operation processes.

For instance, the determination of race conditions in atomic operations might have a significant influence on the multiprocessor system validation. Race conditions, or race hazards, are flaws in a system or process which lead to an output of the process which is unexpected and critically depends on the sequence or timing of other events. Atomic operations are operations that can be combined so that they appear, to the rest of the system, to be a single operation with only two possible outcomes: success or failure. Atomic operations can be classified as modifying operations and non-modifying operations, where modifying operations are used to modify the contents of a memory location while non-modifying operations do not have this functionality. An example of an atomic modifying operation is an atomic read-modify-write (Atomic Read Modify Write) instruction which atomically reads a memory location into a register and, conditionally or absolutely, writes a new value back to the location.

Implementing atomic read-modify-write instructions in multiprocessor environments is a difficult task, because atomic read-modify-write operations (as well as other modifying and non-modifying atomic operations) require that no other operation updates the coherency granule during operation. Coherency granules are units of data that are stored in memory, and these units generally have a close relationship to caches that may be used in the system. Coherency granules are units of storage that may, e.g., be cache lines or sectors written to and read from in a manner ensuring that data is consistent between the system memory and the cache.

It is therefore found that atomic operations, and in particular atomic read-modify-write instructions, are difficult to validate and require an extensive and wide variety of stimuli. In the silicon design phase, such operations may lead to errors which are often masked by other operations and thus may not manifest as a program error. Such errors are therefore extremely difficult to debug on a multiprocessor system, in particular on a multi-core or even multi-node system.

SUMMARY OF THE INVENTION

A multiprocessor technique is provided that may facilitate providing tools and methodologies to validate and/or quantify the robustness of atomic operations, such as atomic read-modify-write instructions for a given system architecture and settings. Embodiments may allow for identifying and reporting actual and potential errors in such operations.

In an embodiment, a multi-core microprocessor is provided that has a plurality of processor cores coupled to a bridge element. The bridge element is configured to send transactions to and/or receive transactions from the processor cores. Each transaction comprises one or more packets. The transactions include a transaction representing an atomic instruction. The bridge element comprises a buffer unit which is configured to store a time stamp for each packet sent to and/or received from the processor cores.

In another embodiment, a multiprocessor system comprises a plurality of microprocessor nodes which each have a plurality of microprocessor cores. The plurality of microprocessor nodes and cores are connected to form a transactional point-to-point communication network. The multiprocessor system further comprises debug hardware which is adapted to validate atomic operations. The debug hardware is configured to capture and time stamp intra-node and/or inter-node transaction packets.

According to still another embodiment, there is provided a method of detecting errors which are caused by a modifying atomic transaction in a multi-core microprocessor environment. The method comprises collecting data which relates to packets pertaining to the modifying atomic transaction and other transactions which are communicated between microprocessor cores of the environment. The method further comprises processing the collected data and evaluating results of the processing. The data includes time stamps which indicate a point of time at which the respective packets have been transmitted between the respective microprocessor cores.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
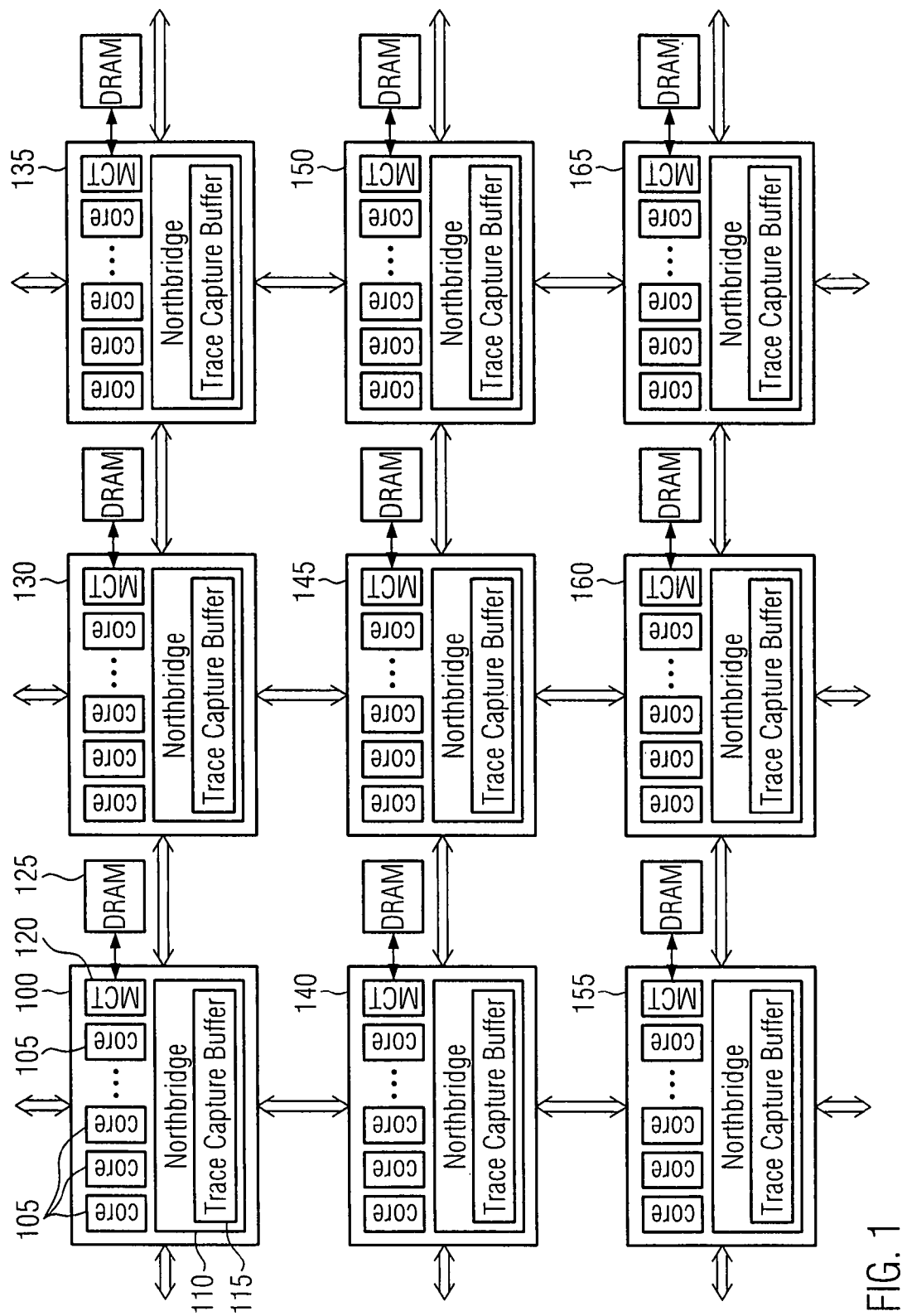
FIG. 1 is a block diagram illustrating a multi-core multi-node microprocessor system according to an embodiment.

Referring firstly to FIG. 1, a multi-core multi-node microprocessor system is shown according to an embodiment. The system includes a number of nodes 100, 130, 135, 140, 145, 150, 155, 160, 165 which are coupled to each other to form a point-to-point communication network. In each of the nodes, there may be a plurality of processor cores 105 which are part of the network.

The multi-core multi-node communication network shown in FIG. 1 may be a transactional network in the sense that transactions may be sent from one core to another core within a node, or from one node to another node. Thus, there may be intra-node as well as inter-node traffic in the multi-core multi-node microprocessor system of the embodiment shown in FIG. 1.

In the embodiment, the multi-core microprocessors forming the nodes 100, 130-165 combine two or more independent processors 105 into a single package, or into a single integrated circuit. The multi-core microprocessors may exhibit some form of thread-level parallelism without including multiple microprocessors in separate physical packages. Thus, the multi-core microprocessors themselves may allow for some kind of chip-level multiprocessing.

A plurality of nodes may be placed on a single motherboard or, in another embodiment, may be at least in part packaged together. In another embodiment, some or all of the nodes may even be loosely coupled or disaggregated to some extent.

As shown in FIG. 1, each node 100, 130-165 of the transactional point-to-point communication network has a northbridge 110. A northbridge, or memory controller hub (MCH), is a chip in the core logic chipset that may handle communications between the processors cores 105 and memory. In the embodiment of FIG. 1, the northbridge 110 in each node 100, 130-165 is connected to the cores 105 of the respective node, and to a memory controller (MCT) 120. The northbridge 110 is also used to handle the inter-node traffic. It is noted that other embodiments may make use of bridge elements other than northbridges.

As mentioned above, the nodes and cores form a transactional point-to-point communication network. In an embodiment, the multi-core multi-node microprocessor system of FIG. 1 may be configured to use HyperTransport transactions, but other embodiments may exist that make use of other transactions. In general, a transaction may be understood to be a single activity within a computer system that may be signaled by means of a message that requires a response or does not require a response, dependent on the type of transaction.

As will be described in more detail below, transactions may be built from multiple packets that are sent to or received from the respective nodes and cores at different points of time. In the embodiment, transactions are used to perform atomic updates for critical tasks in the multiprocessor environment.

In the embodiments, intra-node traffic and inter-node traffic is captured to be analyzed in a post-silicon microprocessor validation process. Intra-node traffic, i.e. inter-core traffic, may be captured in the embodiment through a trace capture buffer (TCB) 115 present in each node 100, 130-165. Inter-node traffic may be captured through a logical analyzer (not shown). It is noted that the trace capture buffers 115 may be used in other embodiments to capture both intra-node as well as inter-node traffic.

As apparent from FIG. 1, the trace capture buffers 115 of the present embodiment are located within the northbridges 110 or other bridge elements used in the multi-core microprocessors 100, 135-165 for handling the transactional traffic. According to other embodiments, the trace capture buffers 115 may be located within each node but external to the northbridge 110.

In an embodiment which will be described in the following, the trace capture buffers 115 are programmed to capture all inter-core and inter-node packets flowing through the system. The trace capture buffers 115 will further time stamp each packet at the time of capturing the packet. Thus, the time stamp may indicate a point of time at which the respective packet has been captured and stored in the buffer. This point of time may be equal or similar to the point of time at which the packet was sent or received by the respective node or core. In other embodiments, there may be a small time difference between sending and receiving the packets, and capturing them in the buffer.

The time stamp may be based in an embodiment on a globally usable and synchronized clock (not shown). By using a global clock, it is ensured that the time stamps of all captured packets in all trace capture buffers 115 may be validly compared.

In the present embodiment, the trace capture buffers 115 in each node 100, 130-165 are configured to capture any traffic passing through the respective northbridge 110. In this embodiment, a northbridge 110 acts as coherency point for the respective node 100, 130-165. That is, all inter-core traffic, any access to the memory controller 120, and any access to remaining nodes 100, 130-165 and peripherals of the system (not shown) pass through the northbridge. It is to be noted that the communication network may transport coherent and non-coherent traffic.

The present embodiment chooses the size of the trace capture buffers 115 to be large enough to be non-intrusive, even for large multiprocessor programs. However, it may nevertheless happen that a trace capture buffer 115 is completely filled. The trace capture buffer may then drain (or store) its contents in the memory 125, which may be a DRAM (Dynamic Random Access Memory). This process may be controlled by the memory controller 120.

In an embodiment, the trace capture buffer 115 will stall the northbridge while it empties its contents into the DRAM. The act of stalling the northbridge 110 may make the trace capture buffer 115 intrusive but when choosing the size of the trace capture buffer 115 to be sufficiently high then there will be almost no need to stall the northbridge 110 anymore.

Figure 2:
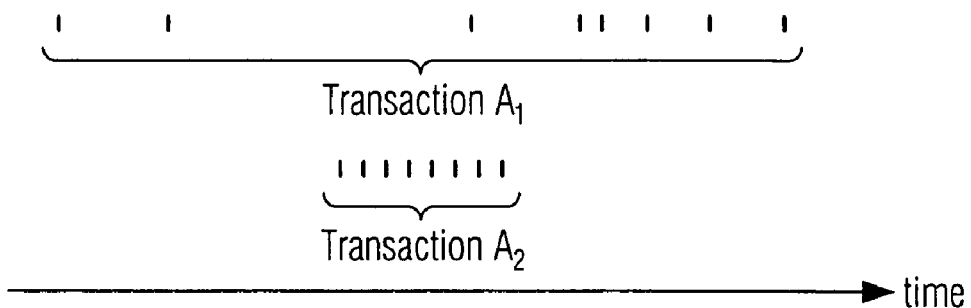
FIG. 2 illustrates the timing of packets in transactions according to an embodiment.

As already mentioned above, each transaction may contain multiple packets. Referring to FIG. 2, the number and type of packets per transaction may vary from transaction to transaction. Referring to FIG. 2, two transactions, $A_1$ and $A_2$, are shown which are of the same type. As can be seen from the figure, a transactions of the same type may require vastly different time periods to complete. These transactions may have packets occurring in the same sequence, but the packet time stamps relevant to each other may be completely random. It is noted that this may be due to a communication protocol which does not restrict the minimum time required to complete a transaction, and which does not restrict the elapsed time between packets for a given transaction.

It is further noted that packets from different transactions may be randomly interspersed between other transactions. In this case, the northbridge 110 of the respective node 100, 130-165 stitches the packets together based on the transaction ID to form or complete the transaction. Each transaction may have an initiating core and may contain packets destined for and arriving from multiple nodes/cores.

Figure 3:
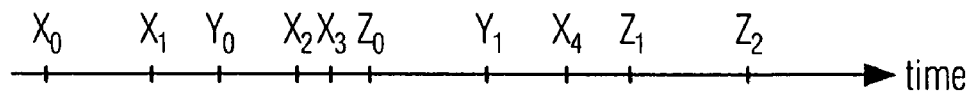
FIG. 3 shows that transactions may have packets intermingled according to an embodiment.

FIG. 3 gives an example of transactions X, Y, Z which have their packets $X_i$, $Y_i$, $Z_i$ intermingled. As can be seen, the first packets arrive at different points of time, and a new transaction may take place even though there are packets remaining for other transactions that have not yet been completed.

Figure 4:
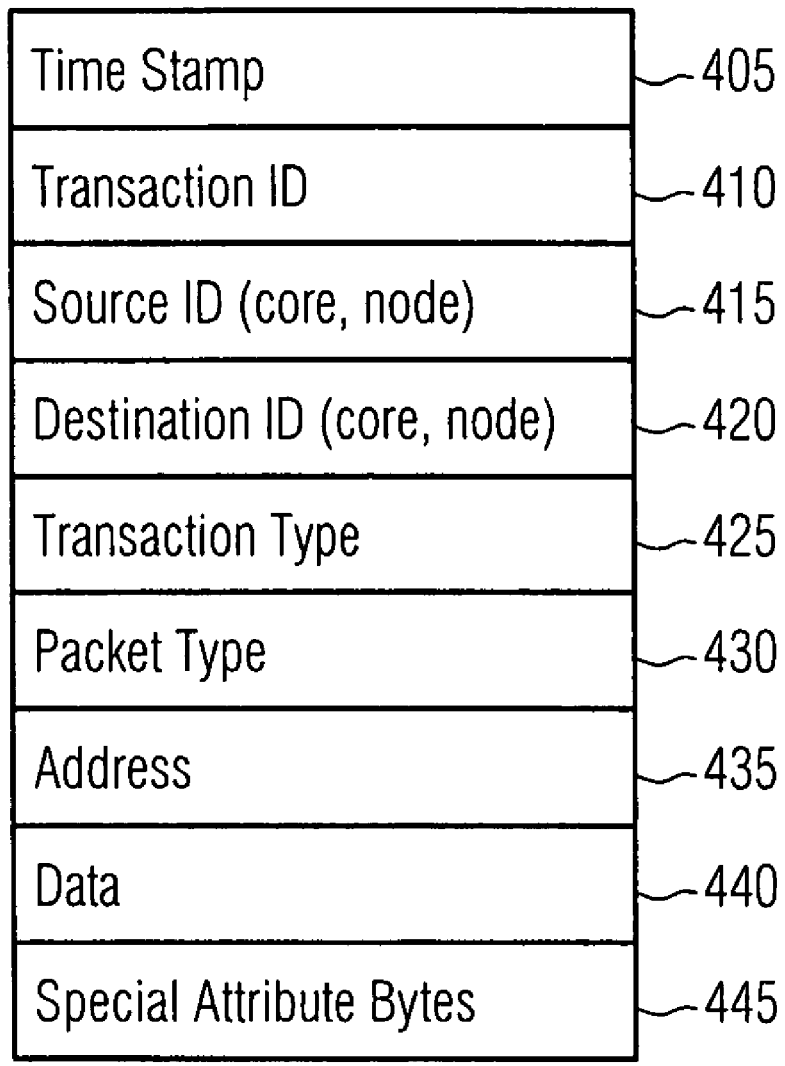
FIG. 4 illustrates contents of a trace capture buffer according to an embodiment.

As described above, the trace capture buffers 115 of the microprocessor nodes 100, 130-165 may capture the transactions to collect respective packet data. FIG. 4 illustrates an embodiment of what kind of information may be captured for each packet. As apparent from the depicted embodiment, the trace capture buffer 115 stores, for each packet, a time stamp 405, a transaction ID 410 identifying the transaction to which the packet pertains, a source ID 415 identifying the core and/or node from which the packet originates, a destination ID 420 identifying the core and/or node to which the packet is destined, a transaction type 425 and a packet type 430 as well as addresses 435 and data 440 together with special attribute bytes 445.

Figure 5:
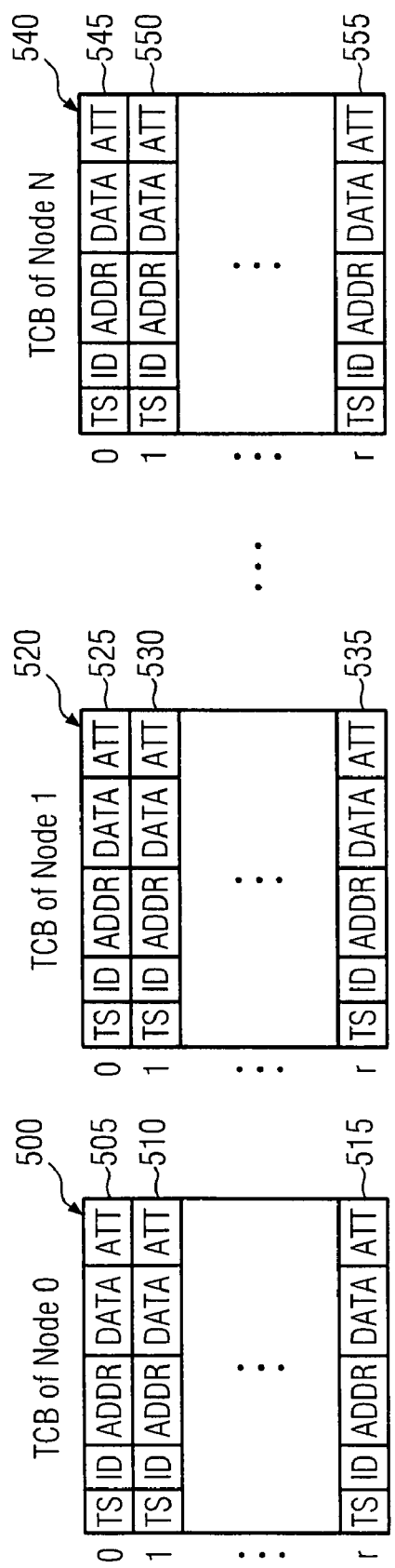
FIG. 5 illustrates contents of trace capture buffers in a multi-node microprocessor system according to another embodiment.

This information may be stored in the trace capture buffers 115 in the form shown in FIG. 4, or it may be stored, for instance, as illustrated in FIG. 5. As can be seen from this figure, the trace capture buffers 115 in each node 100, 130-165 may store the packet information in tables 500, 520, 540. Each row 505, 510, 515, 525, 530, 535, 545, 550, 555 in each node 100, 130-165 includes packet information of a single packet. Each row may have a field TS storing the time stamp 405, a field ID storing the transaction ID 410, source ID 415 and destination ID 420, a field ADDR storing the target address 435, a field DATA storing the data 440 to be read, modified and/or written, and a field ATTR storing attributes 445 of the packet. Although not shown in FIG. 5, there may be optionally a field in each row storing the transaction type 425.

It is shown in FIG. 5 that there are N nodes, each having r rows. It is, however, to be noted that the number of rows may differ from node to node.

As will be described in more detail below, the embodiments may make use of the buffered transaction packet information to determine packet-to-packet probability densities. This will now be described with reference to atomic read-modify-write transactions in relation to transactions of any other kind. It is, however, to be mentioned that the embodiments may make use of other modifying or non-modifying atomic transactions rather than atomic read-modify-write transactions.

Figure 6:
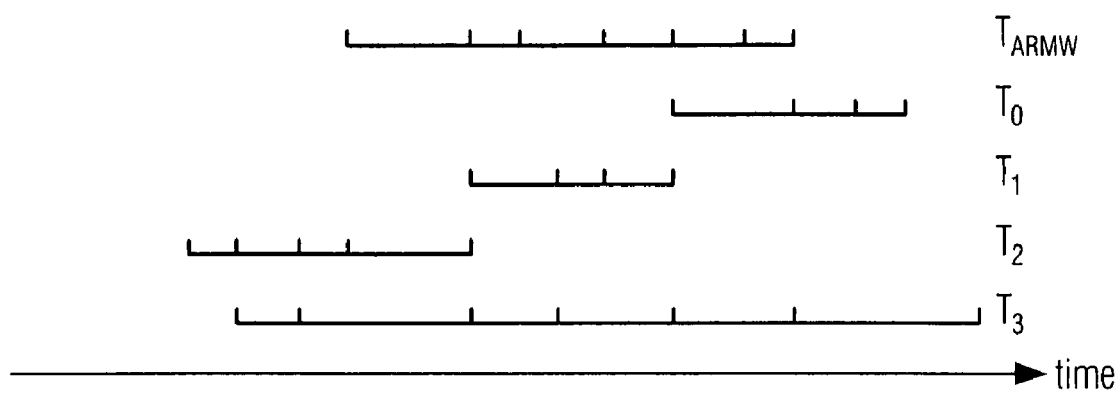
FIG. 6 gives an example of overlapping transactions.

As described above and further illustrated in FIG. 6, transactions may overlap in time. In the example of FIG. 6, there are four transactions $T_o$, $T_1$, $T_2$ and $T_3$ which overlap with the atomic read-modify-write transaction $T_{ARMW}$. The methodology of the embodiments is based on the understanding that the probability of an error in the atomic read-modify-write transaction may depend on the number and type of other transactions that overlap in time with the atomic read-modify-write transaction. Thus, the embodiments may first determine which other transactions overlap in time, and then evaluate an error probability.

Figure 7:
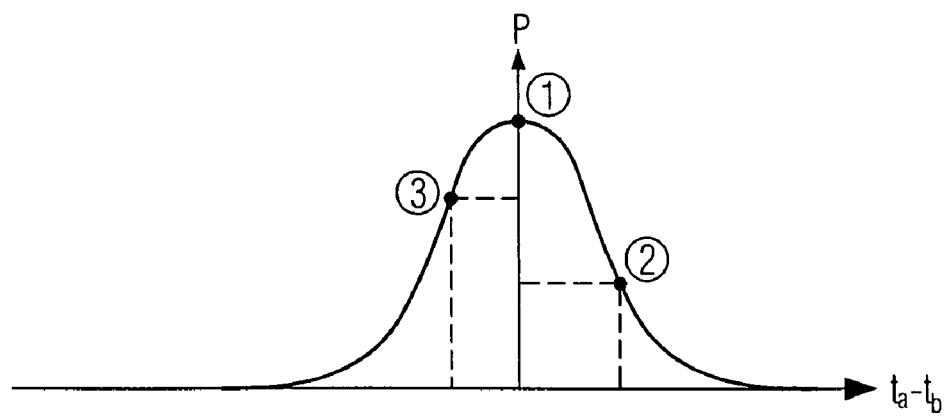
FIG. 7 illustrates examples of time stamp dependent probability value determination according to an embodiment.

Moreover, the embodiments may do this evaluation on a packet basis. That is, each packet in the atomic read-modify-write transaction $T_{ARMW}$ may have its own probability density function with respect to each packet in the overlapping transactions $T_o$, $T_1$, $T_2$, $T_3$. For instance, let $t_a$ be the time stamp of a given packet in the atomic read-modify-write transaction, and $t_b$ be the time stamp of a given packet in one of the other transactions $T_o$, $T_1$, $T_2$, $T_3$, a distribution function such as that shown in FIG. 7 may be chosen to determine an inter-packet probability value. As illustrated by point No. 1, the probability value is at its maximum when the time stamps are the same. The greater the difference between the time stamps, the smaller the probability value, cf. points 3 and 2.

In an embodiment, the distribution function may be that of a normal distribution, i.e. a Gaussian function:

$$P(a, b) = \frac{\gamma}{\sigma\sqrt{2\pi}} \exp\left(\frac{(|t_a - t_b| - \mu)^2}{2\sigma^2}\right)$$

It is, however, to be noted that other probability distribution functions can be used in further embodiments. For instance, a distribution function may be chosen that is symmetric and has its maximum when there is no time difference. For instance, a function can be chosen to have a triangular curve lineally decreasing with growing time differences. It is to be noted that embodiments may exist even having asymmetric functions.

Figure 8:
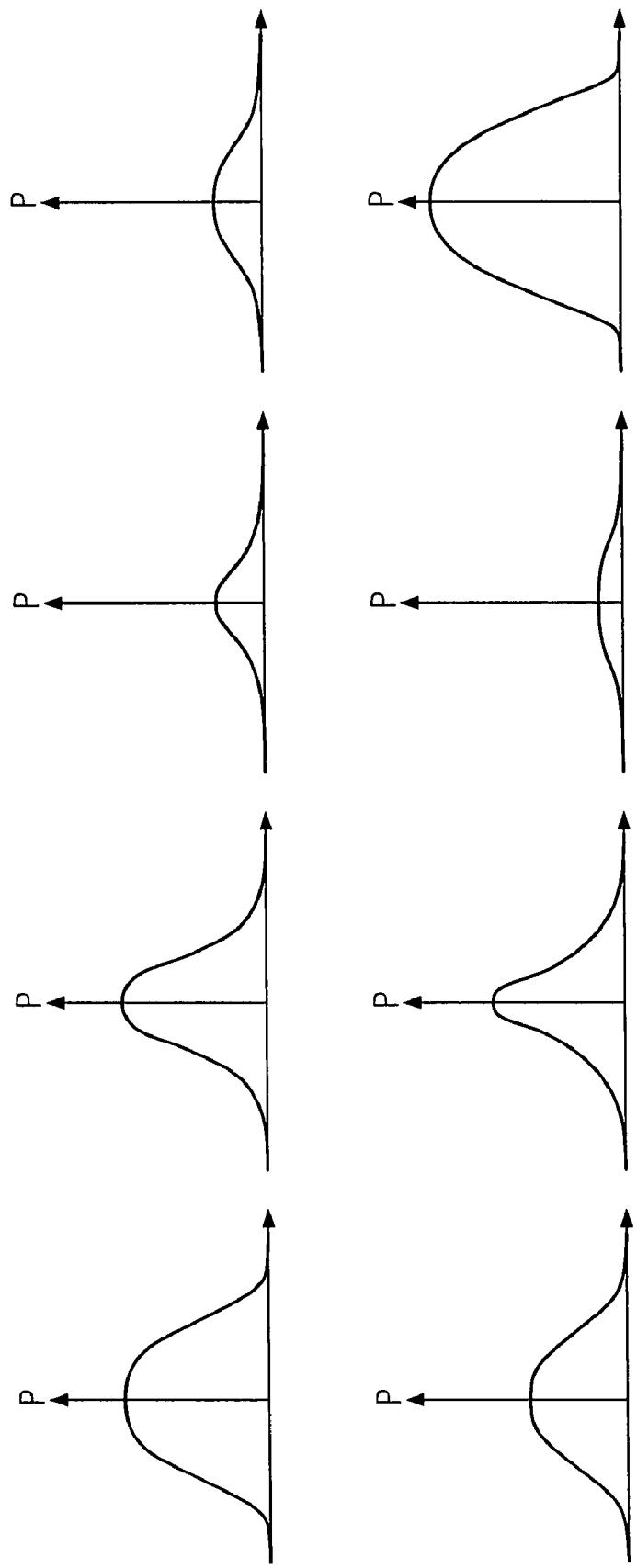
FIG. 8 provides several shapes that may be used for various packet pairs according to an embodiment.

Referring back to the embodiment applying a normal distribution, the distribution parameters may be grouped together as $\langle\mu, \sigma, \gamma\rangle$ where $\mu$ is the mean, $\sigma$ is the standard deviation, and $\gamma$ is a constant. These distribution parameters may be chosen in an embodiment to be unique for each packet-to-packet relation, leading to curves such as those shown in FIG. 8. Thus, embodiments may use distribution functions of different height and shape for each packet pair.

Figure 9:
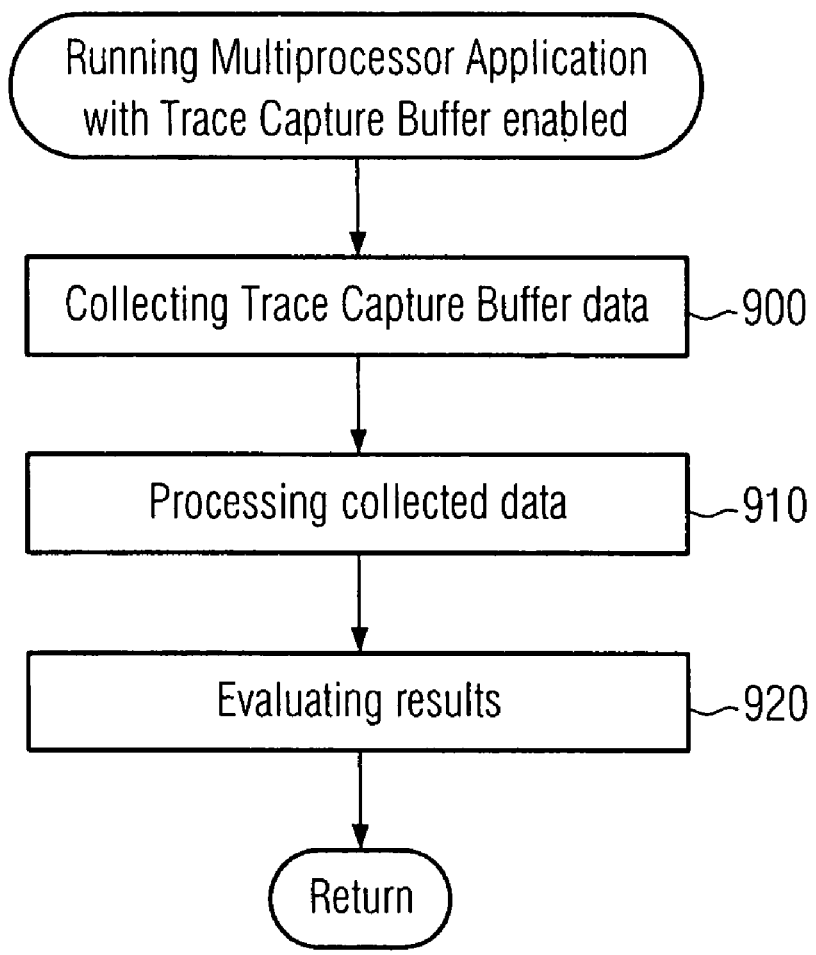
FIG. 9 is a flow chart illustrating steps to be performed when running a microprocessor application according to an embodiment.

Referring now to FIG. 9, the overall process of running a multiprocessor application is depicted. The process starts with collecting trace capture buffer data in step 900. This step includes capturing and time stamping the packets and storing the respective data in the trace capture buffer 115 as shown in FIG. 4 or 5.

In step 910, the collected data is processed. This will be described in more detail when discussing FIGS. 10 and 11. The processing step includes a procedure determining the packet-based probability values dependent on the time differences between the related time stamps.

Finally, step 920 is a step in which the computation results are evaluated as described in more detail with reference to FIG. 12.

Figure 10:
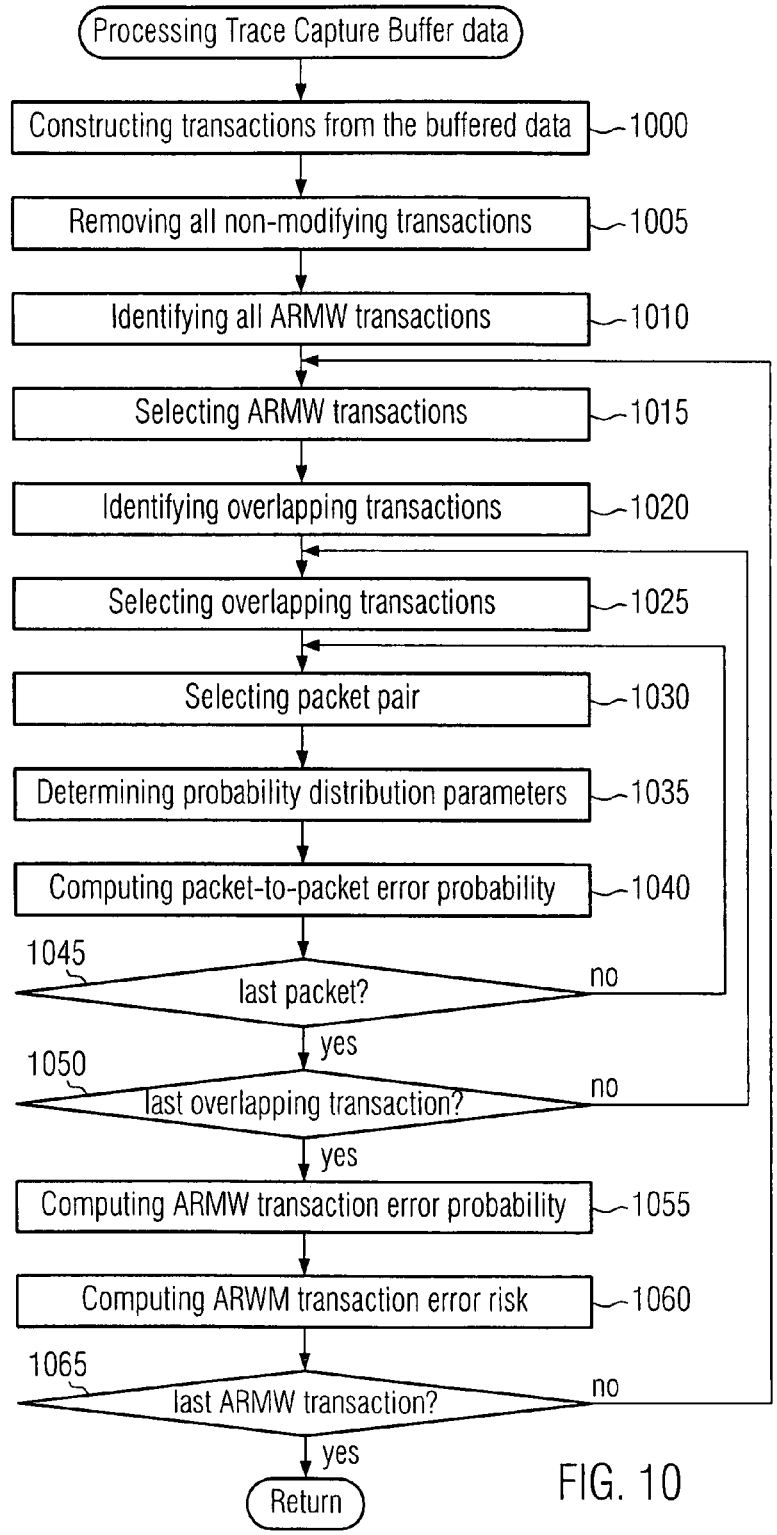
FIG. 10 is a flow chart illustrating how trace capture buffer data may be processed according to an embodiment.

Turning now to FIG. 10, a flow chart is presented depicting an example processing of data in the trace capture buffers 115 of the present embodiments. In step 1000, transactions are constructed from the buffered data by collecting packets with matching transaction IDs. In step 1005, all transactions are removed that do not modify or update data. Then, atomic read-modify-write transactions are identified in step 1010.

As shown in FIG. 10, an iterative process is performed for each atomic read-modify-write transaction. Firstly, a next atomic read-modify-write transaction is selected in step 1015. Then, all transactions that overlap with the selected atomic read-modify-write transaction are identified in step 1020. It is to be noted that in the present embodiment, overlapping transactions are transactions that share the same coherency granule as the selected atomic read-modify-write transaction, and that have at least one packet with a time stamp earlier than the time stamp of the last packet of the atomic read-modify-write transaction, and a time stamp later than the time stamp of the first packet of the atomic read-modify-write transaction.

Once these overlapping transactions have been identified in step 1002, a process is performed for each of the identified overlapping transactions. This process starts with selecting a next overlapping transaction in step 1025, and performing a process for each packet of the atomic read-modify-write transaction. In this process, a next packet of the atomic read-modify-write transaction is selected in step 1030, thereby selecting a packet pair built of one packet in the overlapping transaction and one packet in the atomic read-modify-write transaction.

Once the packet pair is known, respective probability density parameters may be determined in step 1035 and the respective packet-to-packet probability may be computed in step 1040.

Finally, once probabilities are computed for each packet pair, an atomic read-modify-write transaction error probability may be computed in step 1055 and an atomic read-modify-write transaction error risk may be computed in step 1060.

Referring back to the example of FIG. 6 and assuming that overlapping transactions $T_0$, $T_1$, $T_2$ and $T_3$ share the same coherency granule (such as a cache line) as $T_{ARMW}$, the atomic read-modify-write transaction may be written as a collection of packets $q_i$ as follows:

$$T_{ARMW} = \{q_0, q_1, q_2, \ldots, q_j\}$$

where j is the total number of packets in $T_{ARMW}$.

The modifying transactions overlapping with $T_{ARMW}$ may be written as:

$$T_{overlap} = \{T_0, T_1, T_2, \ldots, T_m\}$$

where m is the number of overlapping modifying transactions sharing the same coherency granule. In the set $T_{overlap}$ of transactions, the numbers of packets per transaction may be given by $\{i_0, i_1, i_2, \ldots, i_m\}$. Thus, the number of packets in $T_0$ is $i_0$, the number of packets in $T_1$ is $i_1$ and so on.

The probabilities of atomic read-modify-write violations due to each packet in an overlapping transaction may then be summarized as $$P(T_{ARMW}, T_0) = \{P_{000}, P_{001}, \ldots, P_{00j}, P_{010}, P_{011}, \ldots, P_{01j}, \ldots, P_{0i_00}, P_{0i_01}, \ldots, P_{0i_0j}\}$$

$$P(T_{ARMW}, T_1) = \{P_{100}, P_{101}, \ldots, P_{10j}, P_{110}, P_{111}, \ldots, P_{11j}, \ldots, P_{1i_10}, P_{1i_11}, \ldots, P_{1i_1j}\}$$

$$P(T_{ARMW}, T_m) = \{P_{m00}, P_{m01}, \ldots, P_{m0j}, P_{m10}, P_{m11}, \ldots, P_{m1j}, \ldots, P_{mi_m0}, P_{mi_m1}, \ldots, P_{mi_mj}\}$$

Thus, probability values $P_{xyz}$ are determined where x=0 . . . m denotes an overlapping transaction, y=0 . . . $i_x$ denotes a packet in the overlapping transaction, and z=0 . . . j denotes the packet of the atomic read-modify-write transaction. Thus, several probabilities are computed on a packet-to-packet basis.

As the distribution functions have their maxima when there is no time difference between the time stamps of the respective packets, the probabilities are determined based on a proximity in time between packets of the atomic read-modify-write transaction and packets of the other transactions.

Moreover, as described above, each probability distribution function may have its unique set of parameters. That is, assuming a Gaussian function, computation of $P_{000}$ may make use of $<\mu_{000}, \sigma_{000}, \gamma_{000}>$ while $P_{001}$ is computed using $<\mu_{001}, \sigma_{001}, \gamma_{001}>$. Generally speaking, $P_{xyz}$ is calculated using $<\mu_{xyz}, \sigma_{xyz}, \gamma_{xyz}>$.

These parameters may be determined in step 1035.

Figure 11:
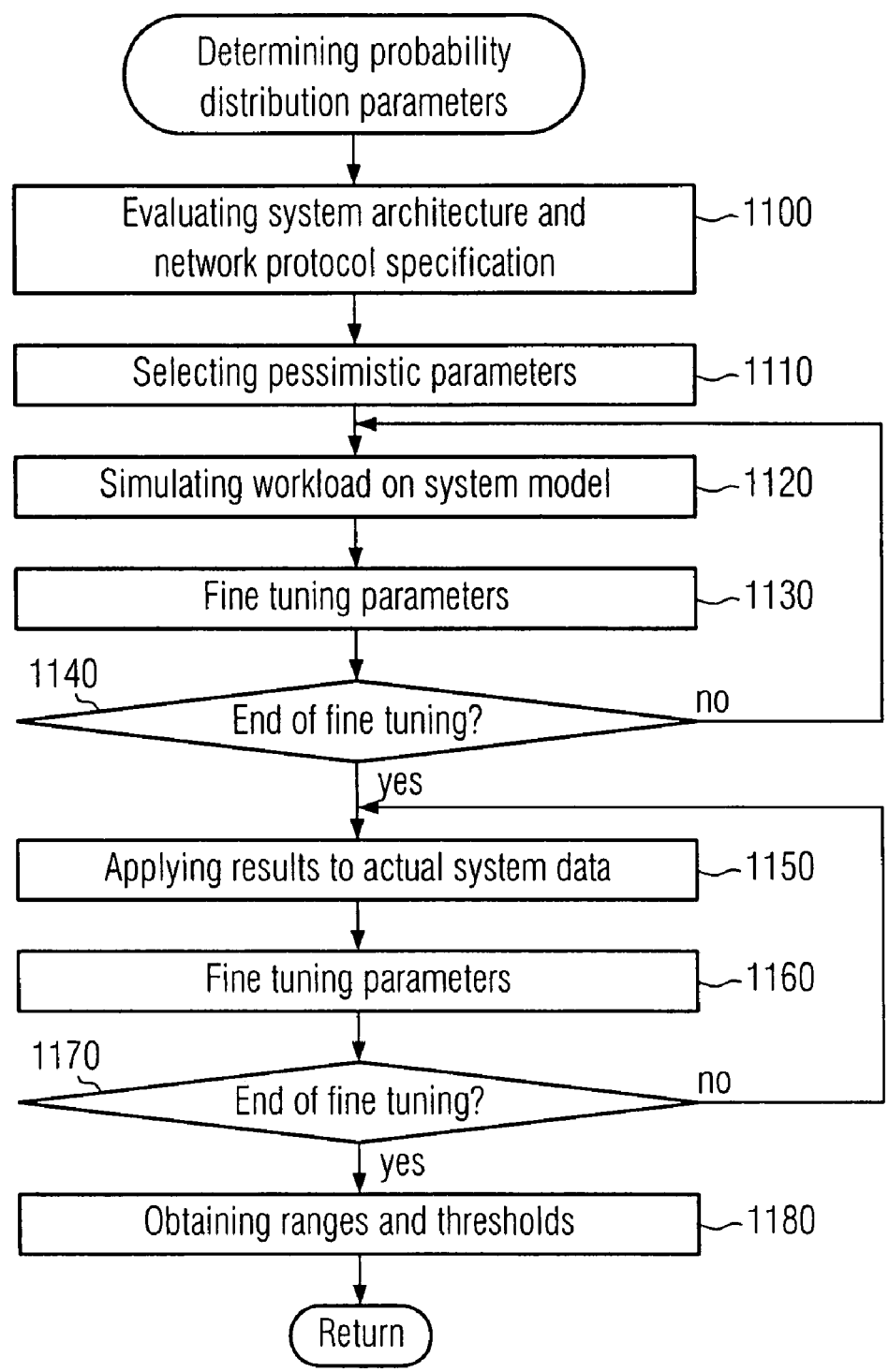
FIG. 11 is a flow chart illustrating a process of determining probability distribution parameters according to an embodiment.

Referring to FIG. 11, which illustrates an example of how to determine the probability distribution parameters, it is noted that the parameters may be derived from the system specification and workload simulations. Some factors for determining the parameter profile may be the system typology, the communication network protocol, cache sizes, the core per node count, the node count, various latencies, the bus width, the traffic intensity, the clock frequency, the transaction type, and the packet type.

The selection of the parameters may start from pessimistic parameters in step 1110 and may then be based on a combination of analysis and simulation. In an embodiment, iterative processes are performed including a fine-tuning based on system data. For instance, once the system architecture and network protocol specification is evaluated in step 1100, the workload may be simulated on the system model in step 1120 and fine-tuned in steps 1130 and 1140. The results may then be applied to actual system data in step 1150, and again fine-tuned in steps 1160 and 1170.

The process of FIG. 11 is shown in FIG. 10 to be one of the steps in processing the trace capture buffer data. However, it is to be noted that the process of FIG. 11 may alternatively be performed separately so that step 1035 may merely access the parameters.

Referring back to FIG. 11, step 1180 is performed to obtain ranges and thresholds. These ranges and thresholds may be used to compute a risk factor to quantify the robustness of an atomic read-modify-write operation.

As multiprocessor applications according to the invention may generate a large number of probability values of failure for an atomic read-modify-write transaction, these probabilities may be grouped into buckets:

| | |
|---|---|
| Bucket 0: | $P > x_1$ |
| Bucket 1: | $x_1 > P > x_2$ |
| Bucket 2: | $x_2 > P > x_3$ |
| Bucket 3: | $x_3 > P > x_4$ |
| . . . | |
| Bucket n: | $x_{n-1} > P > x_n$ |

In an embodiment, threshold $x_0$ may be chosen in step 1180 such that whenever a probability value falls in bucket 0, an atomic read-modify-write error has been detected. In general, the values of thresholds $x_1 \ldots x_n$ are chosen such that the robustness of the atomic read-modify-write transaction may be quantified as a function of the distribution of probabilities within each packet. Thus, the probability values are classified into buckets to give more information than just that an error has occurred.

Figure 12:
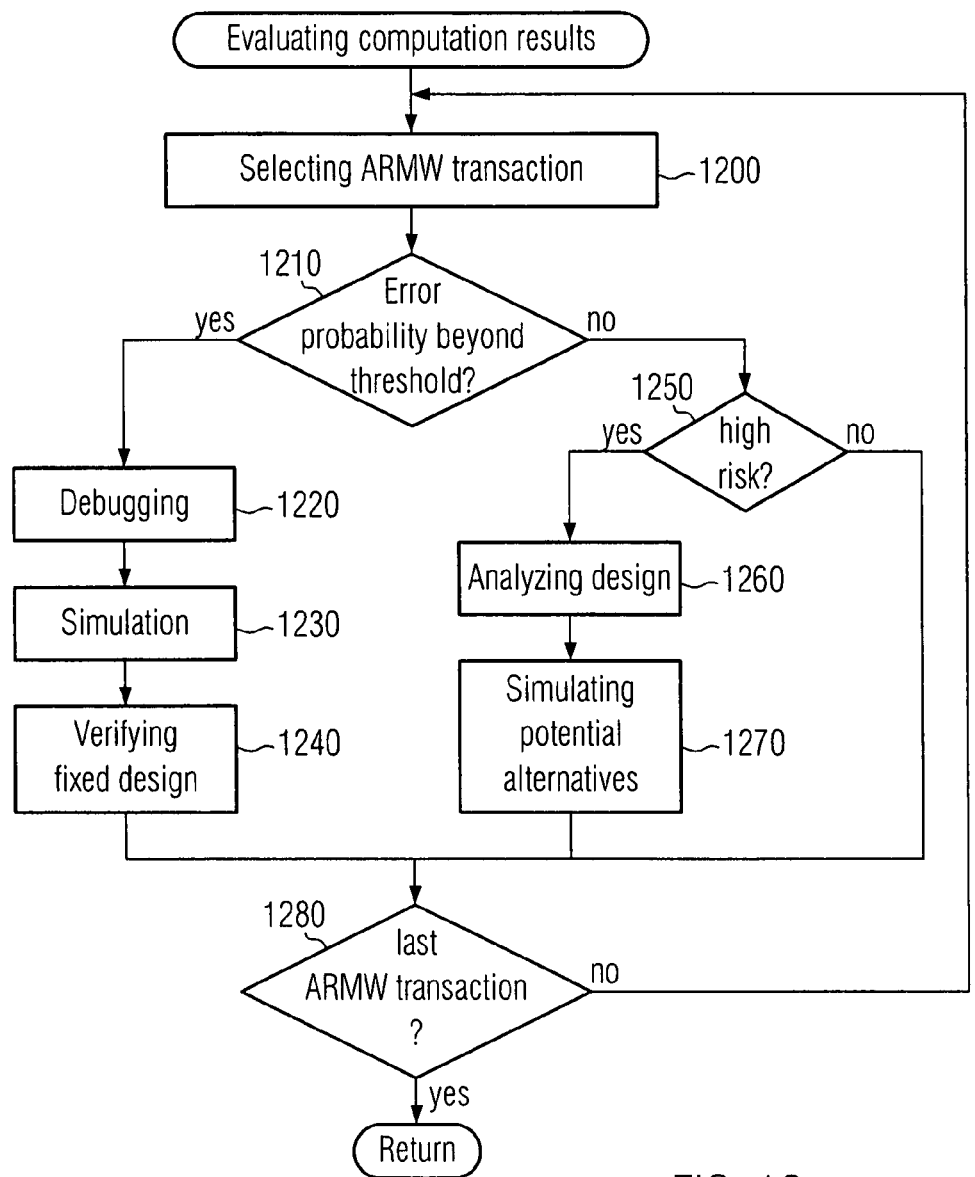
FIG. 12 is a flow chart describing an embodiment of evaluating computation results.

Once the probability distribution parameters and packet thresholds are determined in FIG. 11 and the trace capture buffer data is processed in FIG. 10, the computation results can be evaluated according to the embodiment of FIG. 12. This may allow for modifying the system design accordingly.

Referring to FIG. 12, an atomic read-modify-write transaction is selected in step 1200. It is then determined in step 1210 whether the error probability of the atomic read-modify-write transaction is within the highest bucket. If so, the multiprocessor application can be debugged to find the error root (step 1220). Further simulation may be performed in step 1230 and the fixed, i.e., corrected design may be verified in step 1240.

If it is found in step 1210 that the error probability is not beyond the highest threshold, then the process proceeds to step 1250. Dependent on the bucket in which the error probability falls, the design may be further analyzed in step 1260 and potential alternatives may be simulated in step 1270. Otherwise, the atomic read-modify-write transaction may pass.

Given the description of the various embodiments above, a technique is provided that may allow for debugging atomic read-modify-write and other atomic modifying and non-modifying operation errors in a multi-core multi-node system or any other kind of multiprocessor system. The embodiments may further allow a validation and quantification of the robustness of such atomic operations. This may include debugging the root cause of a design problem, and the quantification of the functional coverage of atomic operations. The validation outcome may then be fed back into test generators to create new appropriate stimuli.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A multi-core microprocessor having a plurality of processor cores coupled to a bridge element, said bridge element configured to send transactions to and/or receive transactions from said processor cores, each transaction comprising one or more packets, said transactions including a transactions representing an atomic instructions, wherein said bridge element comprises a buffer unit configured to store a time stamp for each packet sent to and/or received from the processor cores;
   wherein the multi-core microprocessor is configured to:
   identify packets pertaining to a modifying atomic transaction and packets pertaining to other transactions;
   compute, for each pair of packets built from one modifying atomic transaction and one other transaction, a probability value dependent on the time difference between the related time stamps;
   compare the computed probability value with a threshold; and
   indicate an error if the probability value exceeds said threshold.

2. The multi-core microprocessor of claim 1, wherein said time stamp indicates the point of time at which the respective packet has been captured and stored in the buffer unit.

3. The multi-core microprocessor of claim 1, wherein said other transactions overlap in time with the transaction representing the atomic instruction, wherein the multi-core microprocessor is adapted to identify said other transactions by evaluating the time stamps of their packets.

4. The multi-core microprocessor of claim 1, wherein said other transactions are transactions updating the same coherency granule as the transaction representing the atomic instruction.

5. The multi-core microprocessor of claim 1, adapted to determine said probability based on a normal distribution having distribution parameters being unique for each packet-to-packet relation.

6. The multi-core microprocessor of claim 5, wherein said distribution parameters are selected in an iterative fine-tuning process that includes simulation and analysis of system data.

7. The multi-core microprocessor of claim 1, adapted to detect an error in an atomic instruction by determining probability values for each pair of packets including a packet of the transaction representing the atomic instruction and a packet of another transaction overlapping in time with the transaction representing the atomic instruction, classifying the determined probability values by grouping them into a number of buckets representing different probability ranges, and determining whether the bucket representing the range of the highest probabilities is at least partly filled.

8. The multi-core microprocessor of claim 7, adapted to determine, if no error is detected, a risk factor based on the classification into other buckets than the bucket representing the range of the highest probabilities, and start a simulation process dependent on the risk factor.

9. A multiprocessor system comprising:
   a plurality of microprocessor nodes each having a plurality of microprocessor cores, the plurality of microprocessor nodes and cores being connected to form a transactional point-to-point communication network; and
   debug hardware adapted to validate atomic operations, said debug hardware configured to capture and time stamp intra-node and/or inter-node transaction packets;
   wherein the multiprocessor system is configured to:
   identify packets pertaining to a modifying atomic transaction and packets pertaining to other transactions;
   compute, for each pair of packets built from one modifying atomic transaction and one other transaction, a probability value dependent on the time difference between the related time stamps;
   compare the computed probability value with a threshold; and
   indicate an error if the probability value exceeds said threshold.

10. The multiprocessor system of claim 9, wherein each microprocessor node further has a bridge element coupled to the microprocessor cores of the respective microprocessor node, and said debug hardware comprises a buffer in each bridge element for buffering time stamps of intra-node transaction packets.

11. A method of detecting errors caused by a modifying atomic transaction in a multi-core microprocessor environment, the method comprising:
   collecting data relating to packets pertaining to said modifying atomic transaction and other transactions communicated between microprocessor cores of the environment;
   processing the collected data, wherein processing the collected data comprises:
   identifying packets pertaining to said modifying atomic transaction;
   identifying packets pertaining to said other transactions; and
   computing, for each pair of packets built from one packet of said modifying atomic transaction and one packet of said other transactions a probability value dependent on the time difference between the related time stamps; and
   evaluating results of said processing, wherein said evaluating results comprises:
   comparing the computed probability values with a threshold; and
   indicate an error if at least one of the computed probability values exceeds said threshold;
   wherein said data include time stamps indicating a point of time at which the respective packets have been transmitted between the respective microprocessor cores.

12. The method of claim 11, wherein computing the probability value is based on a symmetric probability distribution function having its maximum when there is no time difference.

13. The method of claim 12, wherein the height and shape of said symmetric probability distribution function depends on the pair of packets for which the probability value is computed.

14. The method of claim 11, wherein identifying packets pertaining to said other transactions comprises:
- selecting only those ones of said other transactions that update the same coherency granule as said modifying atomic transaction and that overlap in time with said modifying atomic transaction; and
- identifying the packets pertaining to the selected transactions.

15. The method of claim 11, wherein selecting the transactions comprises:
- obtaining the time stamp of the respective ones of said other transactions and said modifying atomic transaction to determine whether the transactions overlap in time.

16. A multi-core microprocessor having a plurality of processor cores coupled to a bridge element, said bridge element configured to send transactions to and/or receive transactions from said processor cores, each transaction comprising one or more packets, said transactions including a transactions representing an atomic instructions, wherein said bridge element comprises a buffer unit configured to store a time stamp for each packet sent to and/or received from the processor cores, wherein the multi-core microprocessor is adapted to:
- detect an error in an atomic instruction by determining probability values for each pair of packets including a packet of the transaction representing the atomic instruction and a packet of another transaction overlapping in time with the transaction representing the atomic instruction;
- classify the determined probability values by grouping them into a number of buckets representing different probability ranges; and
- determine whether the bucket representing the range of the highest probabilities is at least partly filled.

* * * * *